(12) United States Patent
Pavley et al.

(10) Patent No.: US 11,538,067 B2
(45) Date of Patent: *Dec. 27, 2022

(54) SYSTEMS AND METHODS FOR PROVIDING AND USING AN INTERNET SENTIMENT INDEX

(71) Applicant: Oath Inc., Dulles, VA (US)

(72) Inventors: John Franklin Pavley, Cranberry, NJ (US); Sang Chul Song, Aldie, VA (US); Sean Christopher Timm, Herndon, VA (US); Thu Rein Kyaw, Reston, VA (US); Saad Mufti, Fairfax, VA (US)

(73) Assignee: Yahoo Ad Tech LLC, Dulles, VA (US)

( * ) Notice: Subject to any disclaimer, the term of this patent is extended or adjusted under 35 U.S.C. 154(b) by 161 days.

This patent is subject to a terminal disclaimer.

(21) Appl. No.: 17/038,378

(22) Filed: Sep. 30, 2020

(65) Prior Publication Data

US 2021/0012385 A1 Jan. 14, 2021

Related U.S. Application Data

(63) Continuation of application No. 13/953,151, filed on Jul. 29, 2013, now Pat. No. 10,832,289.

(60) Provisional application No. 61/835,283, filed on Jun. 14, 2013.

(51) Int. Cl.
*G06Q 30/02* (2012.01)
(52) U.S. Cl.
CPC ..... *G06Q 30/0269* (2013.01); *G06Q 30/0251* (2013.01); *G06Q 30/0254* (2013.01); *G06Q 30/0255* (2013.01); *G06Q 30/0277* (2013.01)

(58) Field of Classification Search
CPC ..................................................... G06Q 30/02
See application file for complete search history.

(56) References Cited

U.S. PATENT DOCUMENTS

| 2007/0282867 | A1* | 12/2007 | McAllister ............. G06Q 30/02 |
| 2009/0044147 | A1 | 2/2009 | Alringer |
| 2009/0248484 | A1 | 10/2009 | Surendran et al. |
| 2010/0121707 | A1 | 1/2010 | Goeldi |

(Continued)

OTHER PUBLICATIONS

Search Report and Written Opinion dated Apr. 13, 2015, in corresponding International Application No. PCT/US2014/041358, filed on Jun. 6, 2014 (12 pages).

(Continued)

*Primary Examiner* — Vincent M Cao
(74) *Attorney, Agent, or Firm* — Bookoff McAndrews, PLLC

(57) ABSTRACT

Systems and methods are disclosed for online distribution of content based on a user sentiment index. The method may include receiving, over a network and from a user device, one or more user generated inputs and calculating the user sentiment index based on the one or more user generated inputs. The method may also include receiving, over the network, from a content or advertising provider, instructions on publishing content or advertising to a webpage based on the calculated user sentiment index, and publishing content for display on user devices over the network based on a comparison of the calculated user sentiment index and the received instructions.

20 Claims, 8 Drawing Sheets

(56) References Cited

U.S. PATENT DOCUMENTS

| | | |
|---|---|---|
| 2010/0119053 A1 | 5/2010 | Goeldi |
| 2011/0119278 A1 | 5/2011 | Hunn |
| 2011/0208522 A1 | 8/2011 | Pereg |
| 2011/0225043 A1 | 9/2011 | Bhatia et al. |
| 2011/0264531 A1* | 10/2011 | Bhatia ............... H04L 51/32 |
| | | 709/224 |
| 2012/0101808 A1 | 4/2012 | Duong-Van |
| 2012/0143683 A1 | 6/2012 | Hertz et al. |
| 2012/0143693 A1 | 6/2012 | Chung |
| 2012/0179751 A1 | 7/2012 | Ahn et al. |
| 2012/0278064 A1 | 11/2012 | Leary et al. |
| 2013/0036126 A1* | 2/2013 | Anderson ......... G06Q 30/0201 |
| | | 707/754 |
| 2013/0066716 A1 | 3/2013 | Chen et al. |
| 2013/0073336 A1* | 3/2013 | Heath ............... G06Q 30/02 |
| | | 705/7.29 |

OTHER PUBLICATIONS

Trademark Electronic Search System (TESS), Super Bowl, Mar. 25, 2015, United States Patent and Trademark Office.

* cited by examiner

SYSTEMS AND METHODS FOR PROVIDING AND USING AN INTERNET SENTIMENT INDEX

CROSS-REFERENCE TO RELATED APPLICATIONS

This application is a continuation of and claims the benefit of priority to pending U.S. application Ser. No. 13/953,151, filed on Jul. 29, 2013, which claims the benefit of priority from U.S. Provisional Application No. 61/835,283, filed on Jun. 14, 2013, each of which is incorporated herein by reference in its entirety.

TECHNICAL FIELD

Various embodiments of the present disclosure relate generally to managing the distribution of online content. More specifically, exemplary embodiments of the present disclosure relate to systems and methods for selectively controlling the distribution of content over the Internet based on a user sentiment index calculated, in part, using user generated input.

BACKGROUND

Owners of Internet websites use various methods to obtain information about Internet users, in order to attract them to websites, provide users with optimized content, and provide advertisers with targeted advertising opportunities. These methods usually involved obtaining information from the user via saved cookies or determining the geographic location of the user by obtaining the user's IP address. For example, existing methods for delivering advertising and content to people are focused on subject matter targeting based on information known about a particular user's demographics or interests. So, if an Internet user is known, from past browsing history, to be interested in luxury automobiles, and therefore profiled as being a high income earner, then an advertising network might deliver ads or sponsored content to the user regarding online banking or automobile loans.

However, the above forms of website promotion and advertising do not differentiate between, or account for, variations in the sentiment of the user or an online community of users and do not differentiate between user sentiment for various subjects. The above-described methods of subject matter targeting and demographic profiling do not take into account the sentiment of users, which may in some cases be more powerful and determinative of whether advertising leads to successful clicks or conversions. For example, in the above example of a high income Internet user, existing techniques may deliver online banking or automobile loan ads or content to the user even though, for example, the stock market crashed in the preceding week, or the user's favorite sports team lost a championship on the preceding day, either of which might, in some circumstances, reduce the value of the targeted ads or content.

Accordingly, a need exists for systems and methods for selectively controlling the distribution of website content based on the sentiment of users. More specifically, a need exists for systems and methods for evaluating the sentiment of online users based on user generated input and selectively controlling website content based on the sentiment.

SUMMARY OF THE DISCLOSURE

According to certain embodiments, computer-implemented methods are disclosed for the online distribution of content based on a user sentiment index. One method includes: receiving, over a network and from a user device, one or more user generated inputs; calculating the user sentiment index based on the one or more user generated inputs; receiving, over the network, from a content or advertising provider, instructions on publishing content or advertising to a webpage based on the calculated user sentiment index; and publishing content for display on user devices over the network based on a comparison of the calculated user sentiment index and the received instructions.

Various embodiments of the method may include one or more of the following features: the one or more user generated inputs is a comment posted on a webpage, the user sentiment index evaluates sentiment of users of one or more websites, the user sentiment index evaluates sentiment of users in relation to one or more subject matter areas, the step of calculating the user sentiment index comprises determining a weight for the one or more user generated inputs, the weight is based on one or more characteristics of the one or more user generated inputs, the step of calculating the user sentiment index comprises receiving one or more reference points defined by a real-world event and further determining the weight of the one or more user generated inputs based on the one more reference points, the step of calculating the user sentiment index comprises filtering the one or more user generated inputs based on at least one characteristic of the one or more user generated inputs, the step of publishing content based on the calculated sentiment index and the instructions comprises comparing the calculated sentiment index with the instructions, to determine if the calculated user sentiment index exceeds a threshold value contained in the instructions.

According to another embodiment, a system for executing online distribution of content, may include: a computer readable data storage device storing instructions for executing an distribution of content, and a processor configured to execute the instructions to perform a method including: receiving, over a network and from a user device, one or more user generated inputs; calculating the user sentiment index based on the one or more user generated inputs; receiving, over the network, from a content or advertising provider, instructions on publishing content or advertising to a webpage based on the calculated user sentiment index; and publishing content for display on user devices over the network based on a comparison of the calculated user sentiment index and the received instructions.

According to another embodiment, a computer-readable medium is disclosed storing instructions that, when executed by a processor, may cause the processor to execute online distribution of content, including: receiving, over a network and from a user device, one or more user generated inputs; calculating the user sentiment index based on the one or more user generated inputs; receiving, over the network, from a content or advertising provider, instructions on publishing content or advertising to a webpage based on the calculated user sentiment index; and publishing content for display on user devices over the network based on a comparison of the calculated user sentiment index and the received instructions.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
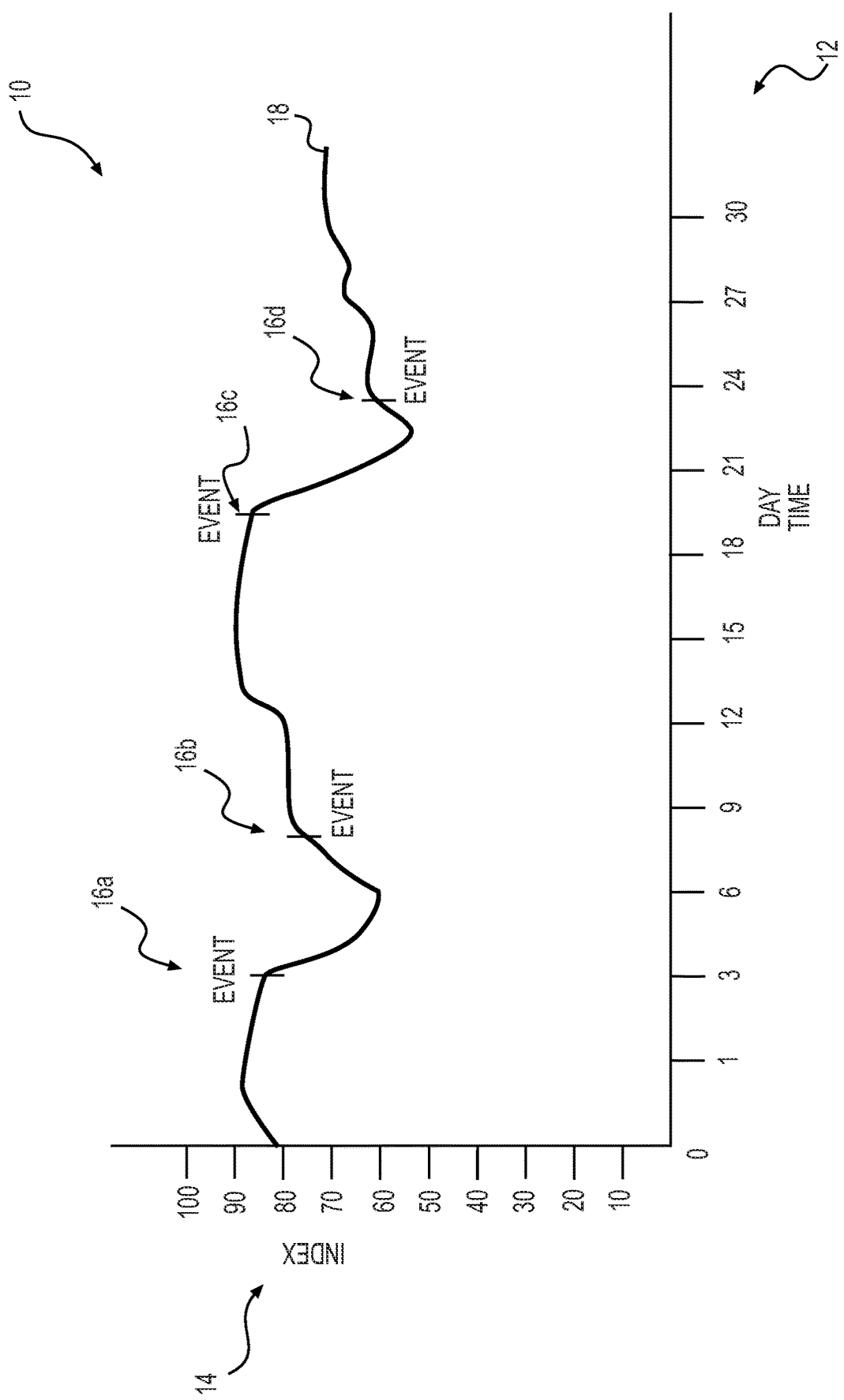
FIG. 1 is a graph showing an online sentiment index over time, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes systems and methods for selectively controlling the distribution of content over the Internet based on measuring user sentiment to provide a sentiment index using website user generated input data, including user comments on a website.

According to embodiments of the present disclosure, content may be distributed on one or more webpages based, in part, on a user sentiment index, which may include one or more of the mood, attitude, opinion, feeling, or other emotion of users at a certain time. The sentiment index may be calculated using various input data, such as user generated input data. For example, relevant user generated content or input data may include one or more of: user comments posted on one or more websites, and/or replies to the comments, user tagging/forwarding/re-posting/linking to etc. of content, user navigation to and from a website, etc.

The various input data may be assigned various weights or coefficients when used in various formulas or algorithms to calculate a sentiment index.

Furthermore, in order to initialize and/or improve the accuracy of the calculation of the index, the user generated input and the calculated index may be retroactively compared to actual events in time having known common sentiments associated with the events, such as via a feedback loop, and may be adjusted based on the comparison. For example, it may be noticed that the number of tags disliking an online article regarding the benefits of online banking may coincide with a news story regarding a major breach in security of a large bank. Based on the temporal correlation between the user generated input (e.g. the number tags disliking the article) and the news story, it may be determined that user generated input of tagging an article from the website on which the article is posted may be a good indicator of online user sentiment. Based on this determination, it may be further determined that user generated input from the website, and article tagging should be assigned a relatively higher weight than other types of user generated input when calculating a sentiment index.

In addition, neural network, regression, and/or any other suitable form of statistical analysis may be performed in order to improve the accuracy of the index calculation based on various types of user generated inputs. The index may be provided directly to Internet content publishers and/or advertisers, which may publish content and/or ads based on the index. For example, consistent with the above described example, if it is determined that online user sentiment toward online banking and banks in general is negative, then banking advertisers may desire to not publish ads directed to banks, whereas online security advertisers may desire to publish ads directed to online security software, and content providers may publish content related to how to protect online security instead of for using online banking. Alternatively, or additionally, advertisers of online banking or banks generally may desire to delay their advertising campaigns until a time when user sentiment is more positive toward those items, or even more positive in general. The sentiment index may evaluate or measure the general sentiment of users or may be targeted to specific website(s) and/or specific subject matter or any other criteria.

FIG. 1 depicts a graph 10 showing an online sentiment index over time, according to an exemplary embodiment of the present disclosure. The graph 10 may be based on one or more online user generated inputs to one or more webpages or all available webpages for one or more subjects (e.g. news, sports, politics). For example, the index of graph 10 may be based on user generated input for a single webpage (e.g. an article regarding a new hospital, a movie review, a recipe, etc.) for a single general subject (e.g. weather, news, politics, sports, etc.), a single event or person (e.g. the Super Bowl, Black Friday, the President, etc.), a specific topic (e.g., mortgage rates, global warming, college tuition, etc.), and/or any other subject or combination of subjects.

The graph may be generated and displayed for a time period 12, which may be any increment of time, for example, seconds, minutes, hours, days, weeks, months, years, decades, etc. The graph 10 may reflect a scale or index 14, which may measure any character or amount of individuals' separate or combined sentiment, using any suitable numbering system and may have a maximum value and a minimum value, such as 0% to 100%, 0 to 10, or any other suitable indicating system. Various values of the index may be correlated with a particular sentiment such as, e.g., happiness, frustration, confidence, anxiety, etc. The graph 10 may optionally reflect one or more events 16a, 16b, 16c, and 16d occurring at known times, each of the events 16a, 16b, 16, and 16d being associated with certain known types or quantities of a given sentiment. For example, an event 16a may occur at a time when the index is relatively high, and may cause the index to drop, whereas event 16b may occur as the index is increasing. The sentiment index 14 may use any suitable numbering system where, for example, a higher sentiment index may be positively correlated with a positive or happy sentiment and a lower sentiment index may be correlated with a negative or unhappy sentiment. The graph 10 may be displayable in any suitable manner and may be manipulated using any suitable user interface to change the view of the graph, for example zooming in and out, changing the time increment 12, etc.

Figure 2:
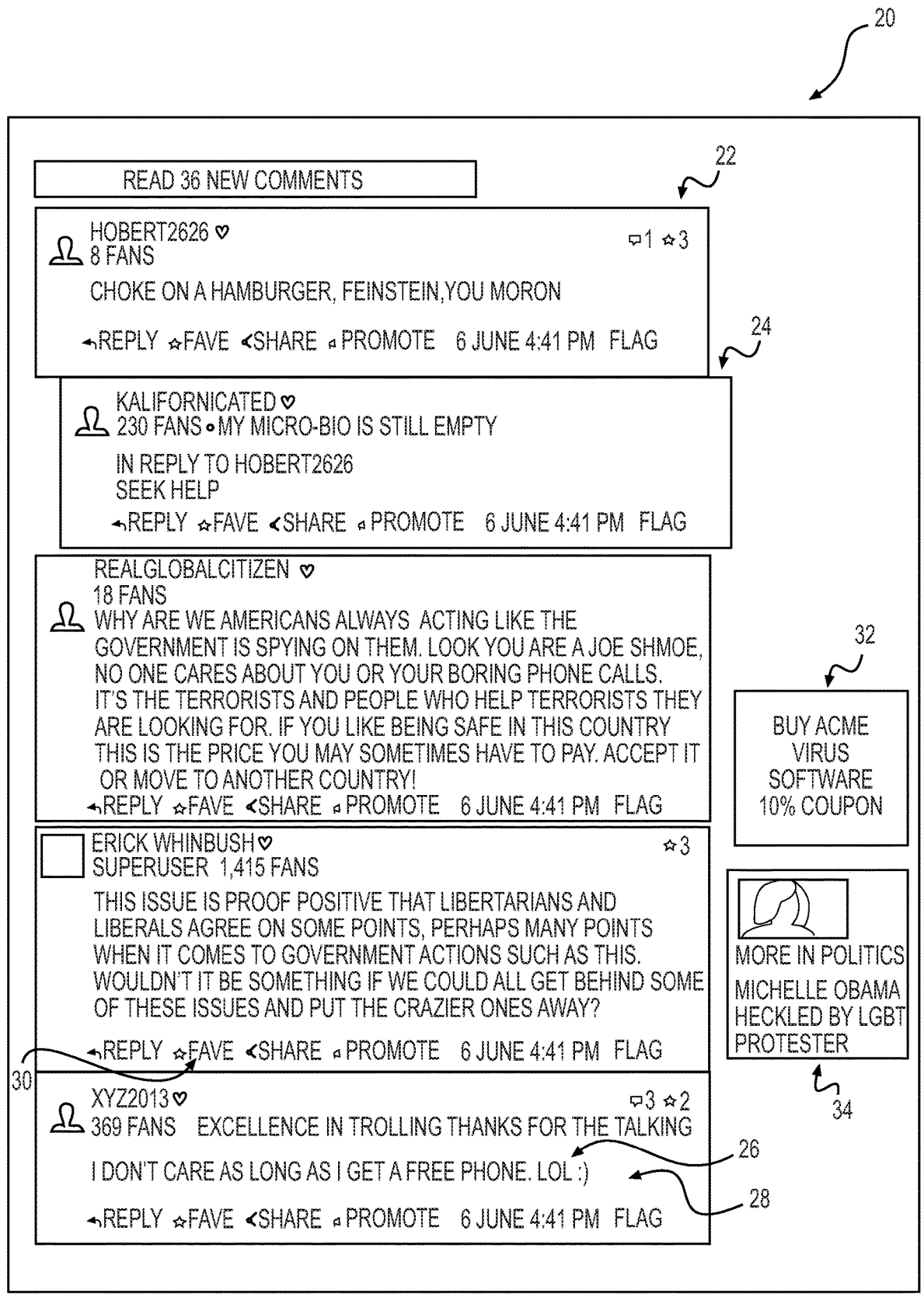
FIG. 2 is a screen shot of an exemplary user generated content (e.g., comments) section of a webpage, according to an exemplary embodiment of the present disclosure.

FIG. 2 is a screen shot of one or more elements of user generated content or input data in the form of a user comments section 20 of a webpage, according to an exemplary embodiment of the present disclosure. The comments section 20 of a webpage, may include one or more comments 22, 28, and one or more replies 24 to the comments 22 and 28. Each of the comments 22, 28 and replies 24 may include any combination of text, numbers, graphics, videos, icons, etc. For example, comments 22, 28 may include any number or type of discourse particles 26, such as "LOL", "OMG", ":)", ":(" etc. The comments section 20 of the webpage may be moderated by the publisher of the webpage to remove comments deemed inappropriate, such as comment 22. The comments section 20 may further include one or more ads 32, and one or more links or previews to content 34 (e.g., sponsored content), which may change based on changes in the index. The ads 32 may have any suitable form, for example an image, animation, video, banner ad, etc. Each posted comment 22, 28 and/or reply 24 may include one or more hyperlinks or tags 30. For example the tags may include a hyperlink or other user element enabling a user to post a reply, favorite, share, promote, flag, like, dislike, etc. As will be discussed in further detail below, information from the comments section 20 may be analyzed and used, at least in part, in calculating a sentiment index, which in turn may be used in determining the distribution of online content and or advertising. The comments section 20 of the webpage may be related to an article directed to a specific or a general topic or may be a user's social media webpage and/or may include comments from other webpages.

Figure 3:
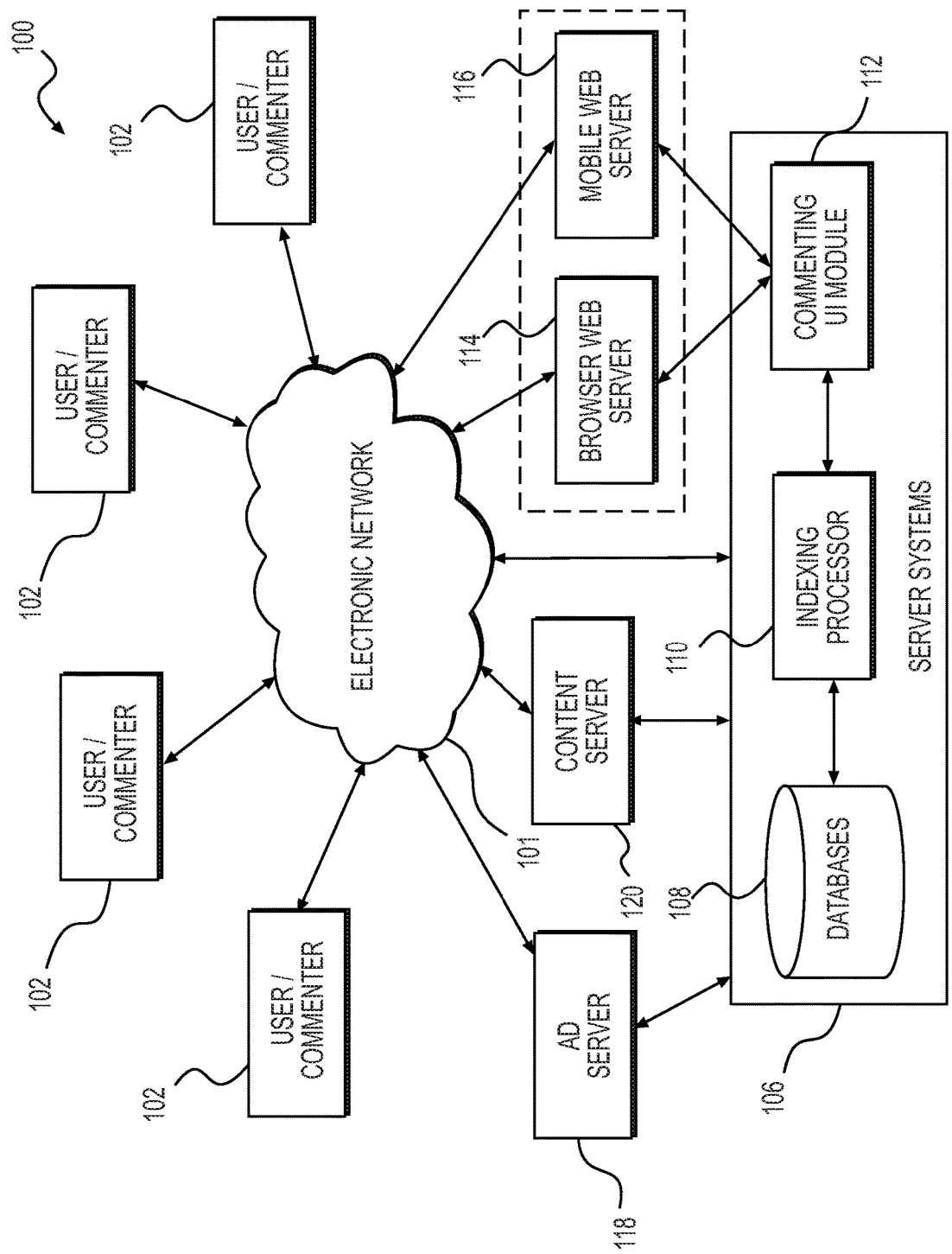
FIG. 3 is a diagram of an online environment and systems for managing the distribution of content over the Internet, according to an exemplary embodiment of the present disclosure.

FIG. 3 is a diagram of an online environment and systems for managing the distribution of content over an electronic network 101 such as the Internet, according to an exemplary embodiment of the present disclosure. As shown in FIG. 3, the online environment 100 may include one or more users/commenters 102, who may be connected to and enabled to submit user generated content and data inputs (e.g., comments) via an electronic network 101, such as the Internet, to various servers, such as an index server system 106, browser web server 114, mobile web server 116, ad servers 118, and content servers 120, each of the servers 106, 114, 116, 118, and 120 may include various components such as memory device(s), processing device(s), and/or user input components. For example, index server system 106 may include one or more databases 108 having computer readable memory for storing data, such as data relating to user generated input, one or more processors 110, and one or more commenting user input modules 112. User generated content and data inputs submitted to the electronic network 101 by users/commenters 102 may be received via the electronic network 101 by the index server system 106 and stored in the database 108 for processing by the indexing processor 110. In addition, the webpage locations from which users arrive at the webpage on which user input data is submitted as well as the webpage locations to which users navigate to after submitting user input data may be stored in memory and may be used in calculating the sentiment index.

The indexing processor 110 may execute instructions, such as programming code, to calculate a sentiment index based on the user generated content and data inputs. The user generated content and data inputs may be reviewed by a moderator and/or according to the instructions, to remove user generated content and data inputs deemed inappropriate. For example, a moderator may remove inappropriate user generated content and data inputs using the UI module 112, either prior to the user generated content and data inputs being posted on a webpage, or at a time after it is initially posted. The occurrence of a comment, its characteristics, and/or the comment itself may be saved in memory, regardless of whether the comment is removed from the webpage. The occurrence and/or characteristics of the removed comment may be used to calculate the sentiment index. The user generated content and data inputs may then be posted on the webpage, via, for example a browser web server 114 of a mobile web server 116, which may include instructions, such a programming instructions to post or publish the user generated content and data inputs in a form viewable on a webpage.

The indexing processor may calculate an index based on the user generated input data and may communicate the index to one or more of the servers 114, 116, 118, and/or 120. The ad servers 118 and content servers 120 may store publishing instructions including parameters for publishing ads and/or content on one or more webpages, based on any suitable user characteristics, including a user sentiment index. The instructions including the publishing parameters may by calculated by the ad or content server 118, 120, and/or related processors or inputted by a user interface. The parameters may be stored in memory, such as a computer readable memory of the servers 118 and 120. The parameters for publishing ads and/or content may be communicated to index server system 106, either directly or via the electronic network 101. The instructions also may include payment information (e.g. the price the advertiser or content provider is willing to pay the publisher for publishing advertisements or content, the size, type, frequency, etc. of the ads or contents) for each set of parameters.

For example, the ad server 118 may communicate a request to the index server system 106 providing parameters, such as a numerical index range pricing, and instructions for publishing one or more ads on a webpage. The index server system 106 may process the request by calculating the index and publishing ads on one or more webpages based on the index value in accordance with the instructions provided by the ad server 118. In another example, the content server 120 may communicate a request to the index server 106 providing parameters, such as numerical index pricing, and/or instructions for publishing content on a webpage. The index server system 106 may process the request by calculating the index and publishing content on one or more webpages based on the index value in accordance with the instructions provided by the content server 120.

In one embodiment, one or more of the ad server 118, the content server 120, and the index server system 106 may be commonly owned and/or may be part of the same system. Alternatively, each of the servers 118, 120 and the index server system 106 may be independently owned and/or administered and each may communicate via an electronic network 101. The communication may be constant e.g. the index server system 106 may continuously provide index information to the servers 118, 120 and/or may only communicate index information to the servers 118, 120 when a request is sent from the server 118, 120. The index server system 106 may retrieve index range parameters from the servers 118, 120 and/or the servers 118, 120 may communicate parameters to the index server system 106.

Figure 4A:
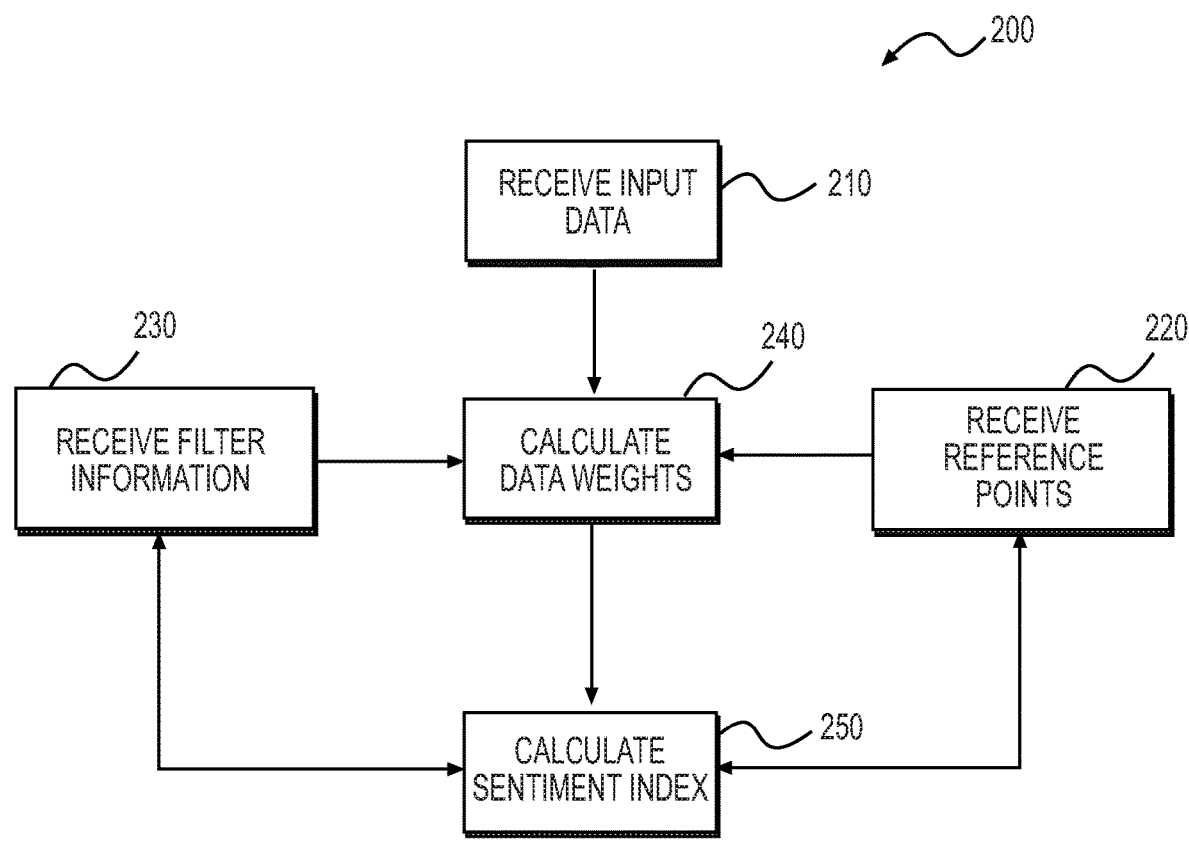
FIG. 4A is a flow diagram of an exemplary method for determining a user sentiment index, according to an exemplary embodiment of the present disclosure.

FIG. 4A is a flow diagram 200 of an exemplary method for determining an online user sentiment index, according to an exemplary embodiment of the present disclosure. As shown in FIG. 4A, user generated input data may be received at step 210. The user generated input data may be any data either inputted by users or generated based on user input. For example, user generated input data may be comments (e.g., comments 22, 24 and 28 of FIG. 2) submitted by users 102 on a webpage or a comments portion of a webpage, one or more requests to delete a comment(s), one or more requests to flag, favorite, or like a comment(s), replies to one or more comments or conversations, or any other data related to user input, as described below with respect to FIG. 4B. Each user generated input data may have one or more characteristics which may be assigned a certain weight and/or may be associated with a particular reference point and/or may be used to filter or exclude data as described below.

Once the input data is received, the electronic device may receive reference point information at step 220. Reference point information may include any event that coincides with or is in close temporal proximity to the input data received at step 210. The input data received at step 210 may be associated with the reference point with which it is coincident in time. For example, the reference point may be a natural disaster, professional sports team victory, election results announcement, death, etc. The occurrence of the event may be used to verify and perform retrospective analysis on the input data and calculated sentiment index via a feedback loop shown in FIG. 4A.

Simultaneously with, before, or after, step 220, the electronic device may receive filter information at step 230. The filter category of information used to exclude input data based on one or more characteristics of the input data, such as geographic, demographic, or any other input data characteristics. For example, in order to determine a sentiment index of the general sentiment of online users, a segment of online users from a particular location or other characteristic, who may be unusually unhappy compared with other users, may be excluded. In another example, a sentiment index of a smaller population of online users may be determined by excluding other users. A smaller population may be defined by demographics, such as location, age, subject matter interest, or any other category.

At step 240, the electronic device, such as indexing processor 110, may calculate data weights for each input data received at step 210. The weight also may be based on the reference point information received at step 220 and/or the filter information received at step 230. For example, comments from users known to be influential and/or determined to have a positive correlation to actual events as determined by statistical analysis, may be given a greater weight relative to other user generated input and those comments which are determined to be machine generated (e.g. spam) may be filtered or excluded. For example, user generated input data in the form of user comments regarding the New York mayoral election having a characteristic of being submitted by users living in New York City may be given a greater weight in determining a user sentiment index of New York City politics compared to comments submitted by users not from New York City. Based, at least in part, on the assigned weights, a sentiment index may be calculated at step 250.

Figure 4B:
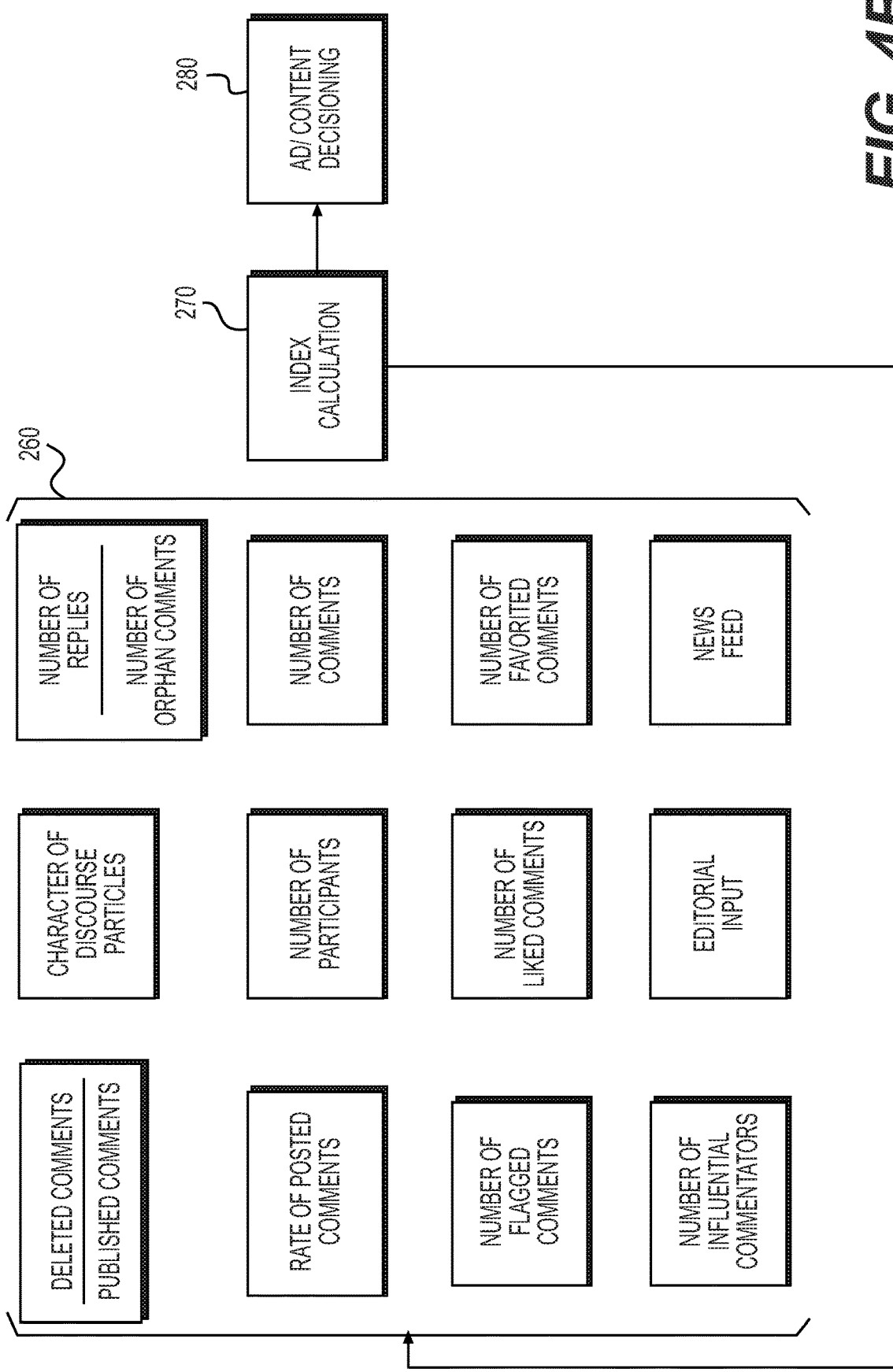
FIG. 4B is a schematic diagram of user generated input data usable in calculating a user sentiment index to determine ad and/or content distribution, according to an exemplary embodiment of the present disclosure.

FIG. 4B is a schematic diagram of examples of user generated input data usable in calculating user sentiment index to determine whether and how to deliver certain ads and/or content, according to an exemplary embodiment of the present disclosure. Any suitable formulas and/or algorithms may be used to calculate the index. Examples of user generated input data 260 may be related to user comments, such as, the number of deleted comments divided by the number of published comments. In one embodiment, the sentiment index may be calculated based on the formula: sentiment index=(1−(number of deleted comments/number of published comments))×100). Comments may be deleted if the comments are deemed inappropriate by the publisher of the webpage. In addition, input data may include the character (e.g. the nature or sentiment) of discourse particles or expressions. Common discourse particles may include letter homophones (e.g. "LOL"), keyboard-generated emoticons and smileys (e.g.:):( ) and/or punctuation, capitalizations and other symbols (e.g. "STOP IT!!!!!!!!!!").

Input data may further include one or more of: a ratio of the number of comment replies to the number of orphan comments; a rate of posted comments; a number of participants in a comment thread or conversation; a number of comments in a comment thread or conversation; a number of flagged comments in a comment thread or conversation; a number of liked comments in a comment thread or conversation; a number of "favorited" comments in a comment thread or conversation; a number of influential commentators in a comment thread or conversation; editorial input; news wire feeds; and/or any other measure of the type or nature of user generated content or input data.

In one embodiment, any combination of the input data 260 may be used in the calculation of an online sentiment index (step 270), and the index calculation may be used to determine the distribution and display of ads and/or content (step 280). In one embodiment, the calculated sentiment index may be calculated as a function of a percentile weighting of a deleted-to-published comment ratio, and a percentile weighting of a reply-to-orphan comment ratio. For example, if it is determined that the deleted-to-published comment ratio is twice as important than the reply-to-orphan comment ratio, then the sentiment index may be calculated as:

$$\text{sentiment index}=0.333*(\text{reply-to-orphan comment ratio})+0.666*(\text{deleted-to-published comment ratio})$$

Of course, the percentile weighting may change based on any user or editorial preference, and the percentile weighting of any of the user input data 260 depicted in FIG. 4B may be included in the calculated sentiment index.

In one embodiment, the sentiment index may be calculated such that the number of liked and favorite comments drive the sentiment index calculation higher, whereas the reply-to-orphan comment ratio, the deleted-to-published comment ratio, and the number of flagged comments all drive the sentiment index calculation lower.

In one embodiment, the sentiment index for a particular time period (e.g., hour, day, week), website scope (e.g., page, site, network of sites), may be calculated as any normalized or weighted variation of the following formula:

$$\text{sentiment index} = \frac{(\text{\# of liked comments} + \text{\# of favorite comments})}{\frac{\text{reply}}{\text{orphan}}\text{comment ratio} + \frac{\text{deleted}}{\text{published}}\text{comment ratio} + \text{\# of flagged comments}}$$

Figure 5:
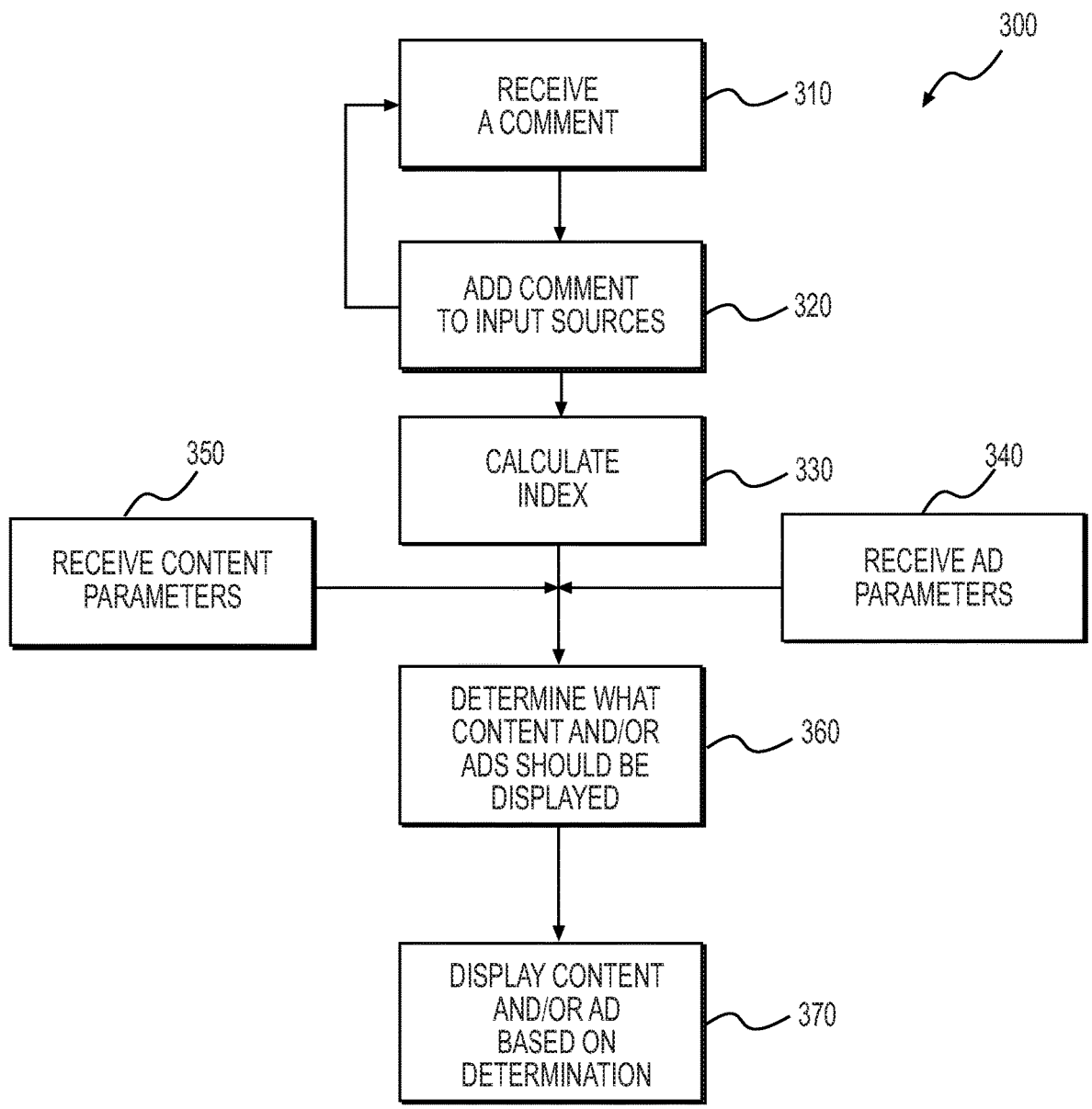
FIG. 5 is a flow diagram of an exemplary method of providing Internet content based on a sentiment index, according to an exemplary embodiment of the present disclosure.

FIG. 5 is a flow diagram of an exemplary method of providing and displaying Internet content and/or ads based on an Internet sentiment index, according to an exemplary embodiment of the present disclosure. A user generated input, such as a user comment may be received at step 310 and added to other input sources at step 320. Of course, any number or type of comments or other user generated content may be received in any amount or sequence, such as in large quantities across many websites and users. The user generated input data may be saved in memory, such as computer readable memory for processing by a processor. As discussed above, the user generated input data may be assigned a weight based on one or more characteristics of the user generated input data for use in calculating a sentiment index.

A sentiment index may be calculated using the input sources at step 330. The index may be calculated for one or more webpages, one or more different subject matter areas (e.g. politics, entertainment, news, sports, local, business, etc.), or any other category. Content and/or advertising publishers may provide instructions having index parameters for publishing ads and/or content at steps 340 and 350, respectively as well as pricing information. For example, a content publisher may send instructions that certain content should be published when the index is between 50-100 and different content should be published when the index is below 50. Based on the index calculated at step 330 and the parameters received at step 350, one or more of indexing server systems 106, and content servers 120 may determine what content should be displayed on a webpage. The content may then be displayed on the webpage at step 370 according to the determination at step 360. In another example, an ad publisher may send instructions that certain ads should be published when the index is between 85-100 and different ads should be published when the index is below 85. Based on the index calculated at step 330 and the parameters received at step 340, one or more of indexing server systems 106, and ad servers 118 may determine what ads should be displayed on a webpage. The content and/or ads may then be displayed on the webpage at step 370 according to the determination at step 360.

At step 360, a determination regarding which type, if any, of content and/or ad to display may also be based on observing a correlation between the volume of comments or any increase or decrease in the rate of change of the index above a pre-set threshold. Based on the observed correlation, content that may be related to the comments may be displayed on a website, such as in a module of top ten news stories. In one embodiment, when the calculated sentiment reaches some predetermined high or low threshold, the indexing processor 110 may generate a list of the top n-number of most viewed articles, a list of the top n-number of searched for keywords, a list of the top n-number of article keyword tags used, and/or a list of the top n-number of trending topics. In one embodiment, ad/content decisioning 280 may be performed by an ad or content server based on one or more of the above n-numbered articles, keywords, tags, and/or topics.

The correlation and related content may also be sent to content publishers and advertisers to inform them of content, keywords, and/or tags which may be related to an increase rate of change of the index. For example, content related to rate of change of the index in a positive direction may be evaluated by advertisers as a favorable time and place to advertise.

Figure 6:
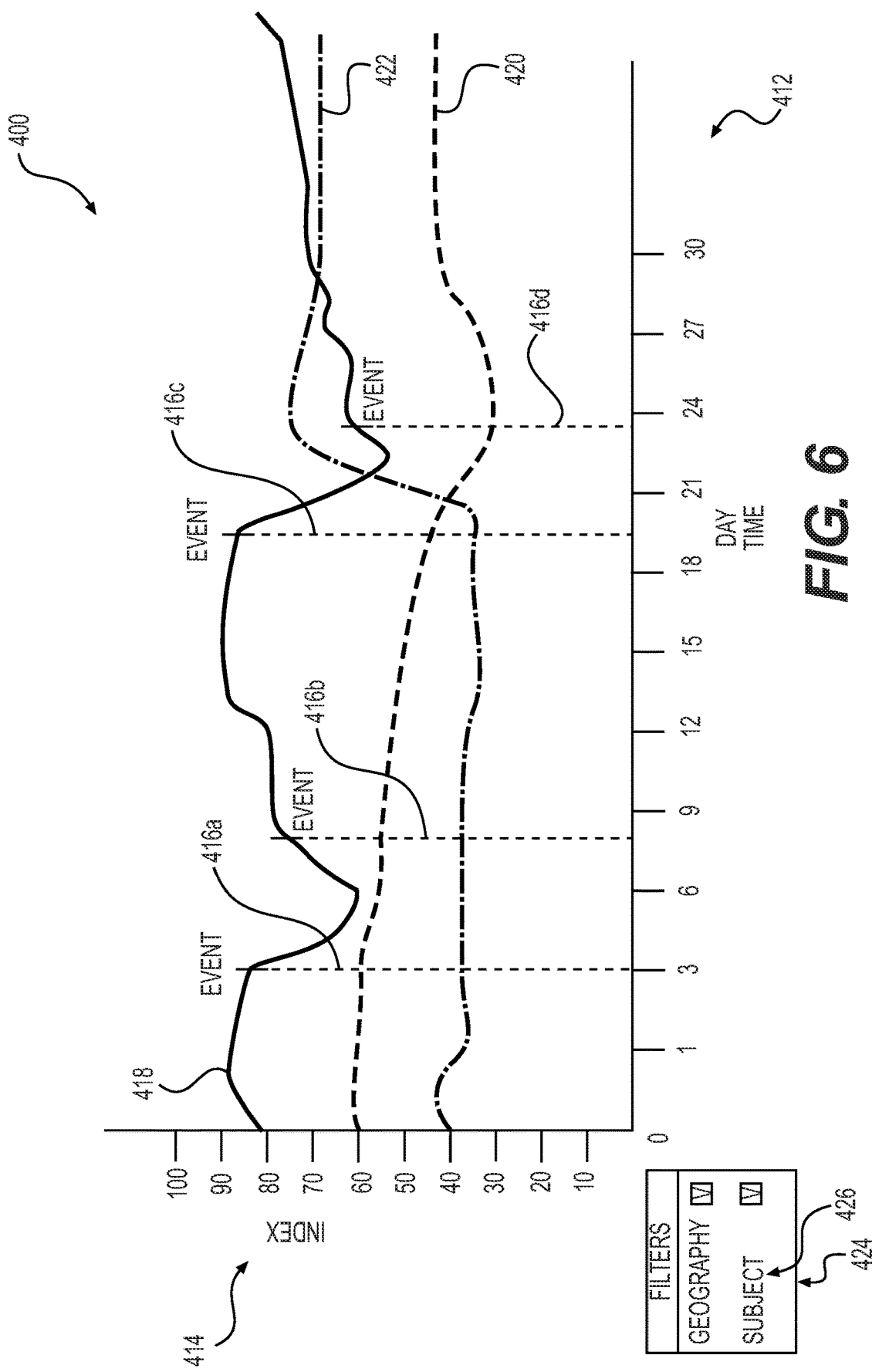
FIG. 6 is diagram showing multiple graphs of online sentiment index values over time, including with applied subject matter filters, according to an exemplary embodiment of the present disclosure.

FIG. 6 is diagram showing multiple graphs of an index over time, including one or more filter values, according to an exemplary embodiment of the present disclosure. As shown in FIG. 6, the diagram 400 shows a graph 418 of unfiltered data of a sentiment index 414 over time 412. The diagram 400 also includes graphs 420 and 422 of filtered input data based on selectable filters 426 from menu 424. The filters may exclude input data in calculating the index and may be based on one or more characteristics of input data. For example, as shown in FIG. 6, the input data may be filtered based on geography, subject matter, and/or any other suitable filter. For example, graph 422 may track index values that are filtered based on excluding all user generated input from users making comments on a web page from New York City and graph 420 may track index values that are filtered based on excluding all user generated input comments relating to the Super Bowl.

EXAMPLE

A user generated input, such as a comment regarding the result of a recent sporting event, may be submitted to a comments section of a webpage. The user generated input may be analyzed and assigned a weight based on one or more characteristics of the user generated input and/or any filters applied, and any reference points. The user generated input and assigned a weight may be added to a sentiment index calculation based on other user generated input data. Content and/or ad parameters submitted and stored in memory may be compared to the current results of the sentiment index calculation and suitable content and/or ads may be published based on the comparison. In addition, the sentiment index may be tracked and viewable in real-time to determine the current sentiment of users of a particular website, users' sentiment regarding a particular subject, and/or any other segment of users or subjects.

In one embodiment, an advertiser or content promoter may desire to only have ads or content shown when overall sentiment is over a predetermined threshold. For example, an advertiser may only wish to advertise when people are happy and therefore more likely to click on an ad that requires consumer confidence to make the click or conversion profitable and worthwhile. Alternatively, an advertiser of other products might only desire to spend ad revenue when people are upset, (i.e., when the sentiment index is below some threshold level) and therefore likely to click on or purchase the advertised product or service (e.g., such as a remedial or self-help program). In addition, various advertisers and/or content promoters may desire to only have their ads or content shown when people within some predetermined demographic or category have a filtered sentiment index above or below some threshold value. For example, an advertiser of political memorabilia might only desire to advertise in locations where sentiment is relatively high among politically-inclined Internet users, following a political election, and not in locations where such sentiment is relatively low. Likewise, an advertiser of a celebrity tabloid subscription might only desire to advertise the subscription at times when sentiment among celebrity-interested users is high (e.g., around a high profile celebrity marriage). Accordingly, the presently disclosed systems and methods may enable advertisers and content providers to selectively target when and where their content is delivered such that it experiences a higher impact among people whose moods and feelings are more aligned with a mind frame consistent with positive action on that advertising or content. Thus, advertisers and content providers may experience increased engagement and revenue resulting from proper application of the presently disclosed techniques.

Figure 7:
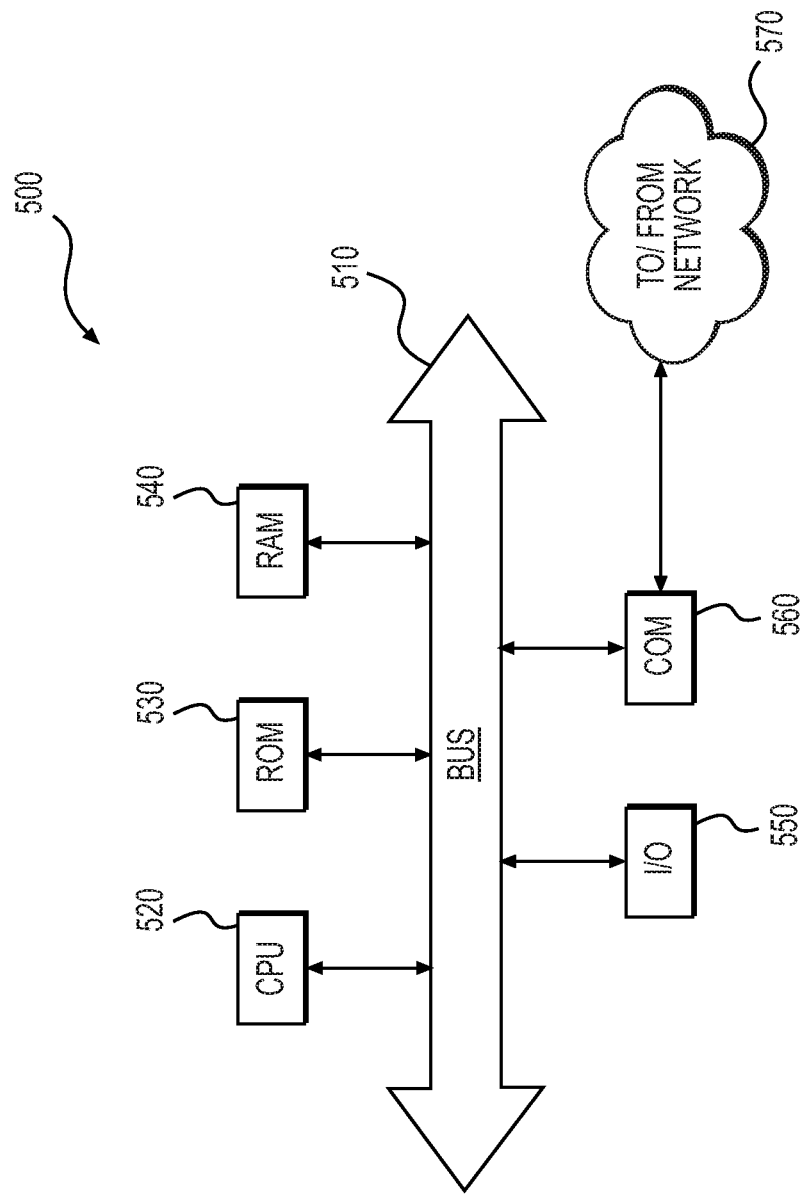
FIG. 7 is a simplified functional block diagram of a computer that may be configured as a host server, for example, to function as an index server system server.

FIG. 7 provides a functional block diagram illustration of general purpose computer hardware platforms. FIG. 7 illustrates a network or host computer platform 500, as may typically be used to implement a server, such as the index server system 106, the ad server 118, and/or the content server 120. It is believed that those skilled in the art are familiar with the structure, programming and general operation of such computer equipment and as a result the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage and data storage for various data files to be processed and/or communicated by the platform such as ROM 530 and RAM 540, although the server 500 often receives programming and data via network communications 570. The hardware elements, operating systems and programming languages of such equipment are conventional in nature, and it is presumed that those skilled in the art are adequately familiar therewith. The server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for distributing webpage content over an electronic network to one or more webpages, the method including:

receiving, at a server processor, a first user generated input over an electronic network from a first user at a first webpage, the first user generated input received at a first user element of the first webpage, and the first user generated input having at least one characteristic that is assigned a weight or is associated with an event;

receiving, at the server processor, a second user generated input over the electronic network from a second user at a second webpage, the second user generated input received at a second user element of the second webpage, and the second user generated input having at least one characteristic that is assigned a weight or is associated with an event;

calculating, by the server processor in real time, a user sentiment index of a population comprising the first user and the second user, the user sentiment index calculated based on a neural network analysis performed of at least one of the first user generated input and the second user generated input, the user sentiment index excluding a third user generated input associated with an excluded user;

upon calculating the user sentiment index of the population, retroactively comparing, by the server processor, each of the first user generated input, the second user generated input, and the calculated sentiment index of the population to known sentiments of one or more events;

adjusting, by the server processor, the calculated user sentiment index of the population based on the retroactive comparison; and distributing, by the server processor over the network, webpage content for display on one or more webpages based on the adjusted calculated user sentiment index of the population.

2. The method of claim 1, wherein at least one of the first user generated input and the second user generated input is a comment posted on a webpage.

3. The method of claim 1, wherein the user sentiment index of the population evaluates sentiment of users of one or more webpages.

4. The method of claim 1, wherein the user sentiment index of the population evaluates sentiment of users in relation to one or more subject matter areas.

5. The method of claim 1, wherein the step of calculating the user sentiment index of the population comprises incorporating the weights of the characteristics of the first user generated input and the second user generated input.

6. The method of claim 5, wherein the weight is based on one or more characteristics of the first user generated input and the second user generated input.

7. The method of claim 5, wherein the step of calculating the user sentiment index of the population comprises receiving one or more reference points defined by a real-world event and further determining the weight of the first user generated input and the second user generated input based on the one or more reference points.

8. The method of claim 5, wherein the step of calculating the user sentiment index of the population comprises filtering the first user generated input and the second user generated input based on at least one characteristic of the first user generated input and the second user generated input.

9. The method of claim 1, wherein the step of distributing webpage content based on the adjusted calculated sentiment index of the population comprises comparing the adjusted calculated sentiment index of the population with received instructions, to determine if the adjusted calculated user sentiment index of the population exceeds a threshold value contained in the received instructions.

10. The method of claim 9, wherein the received instructions comprise parameters for distributing the webpage content and payment amounts.

11. A system for distributing webpage content over an electronic network, the system including:
a computer readable data storage device storing instructions for distributing webpage content; and
a processor configured to execute the instructions to perform a method including:
receiving, at a server processor, a first user generated input over an electronic network from a first user at a first webpage, the first user generated input received at a first user element of the first webpage, and the first user generated input having at least one characteristic that is assigned a weight or is associated with an event;
receiving, at the server processor, a second user generated input over the electronic network from a second user at a second webpage, the second user generated input received at a second user element of the second webpage, and the second user generated input having at least one characteristic that is assigned a weight or is associated with an event;
calculating, by the server processor in real time, a user sentiment index of a population comprising the first user and the second user, the user sentiment index calculated based on a neural network analysis performed of at least one of the first user generated input and the second user generated input, the user sentiment index excluding a third user generated input associated with an excluded user;
upon calculating the user sentiment index of the population, retroactively comparing, by the server processor, each of the first user generated input, the second user generated input, and the calculated sentiment index of the population to known sentiments of one or more events;
adjusting, by the server processor, the calculated user sentiment index of the population based on the retroactive comparison; and
distributing, by the server processor over the network, webpage content for display on one or more webpages based on the adjusted calculated user sentiment index of the population.

12. The system of claim 11, wherein at least one of the first user generated input and the second user generated input is a comment posted on a webpage.

13. The system of claim 11, wherein the user sentiment index of the population evaluates sentiment of users of one or more webpages.

14. The system of claim 11, wherein the user sentiment index of the population evaluates sentiment of users in relation to one or more subject matter areas.

15. The system of claim 11, wherein the step of calculating the user sentiment index of the population comprises incorporating the weights of the characteristics of the first user generated input and the second user generated input.

16. The system of 15, wherein the weight is based on one or more characteristics of the first user generated input and the second user generated input.

17. A non-transitory computer-readable medium storing instructions that, when executed by a processor, cause the processor to perform a method for distributing webpage content, the method including:
receiving, at a server processor, a first user generated input over an electronic network from a first user at a first webpage, the first user generated input received at a first user element of the first webpage, and the first user generated input having at least one characteristic that is assigned a weight or is associated with an event;
receiving, at the server processor, a second user generated input over the electronic network from a second user at a second webpage, the second user generated input received at a second user element of the second webpage, and the second user generated input having at least one characteristic that is assigned a weight or is associated with an event;
calculating, by the server processor in real time, a user sentiment index of a population comprising the first user and the second user, the user sentiment index calculated based on a neural network analysis performed of at least one of the first user generated input and the second user generated input, the user sentiment index excluding a third user generated input associated with an excluded user;
upon calculating the user sentiment index of the population, retroactively comparing, by the server processor, each of the first user generated input, the second user generated input, and the calculated sentiment index of the population to known sentiments of one or more events;
adjusting, by the server processor, the calculated user sentiment index of the population based on the retroactive comparison; and
distributing, by the server processor over the network, webpage content for display on one or more webpages based on the adjusted calculated user sentiment index of the population.

18. The non-transitory computer-readable medium storing instructions of claim 17, wherein the step of distributing webpage content based on the adjusted calculated sentiment index of the population comprises comparing the adjusted calculated sentiment index of the population with received instructions, to determine if the adjusted calculated user sentiment index of the population exceeds a threshold value contained in the received instructions.

19. The non-transitory computer-readable medium storing instructions of claim 17, wherein the user sentiment index of the population evaluates sentiment of users in relation to one or more subject matter areas.

20. The non-transitory computer-readable medium storing instructions of claim 17, wherein the step of calculating the user sentiment index of the population comprises determining a weight for the first user generated input and the second user generated input.

\* \* \* \* \*